(12) United States Patent
Johnson

(10) Patent No.: US 7,536,596 B2
(45) Date of Patent: May 19, 2009

(54) REMOTELY CONTROLLED CHANNEL EMULATOR FOR TESTING OF MAINFRAME PERIPHERALS

(76) Inventor: R. Brent Johnson, Kappelistrasse 6, Zurich (CH) 8002

( * ) Notice: Subject to any disclaimer, the term of this patent is extended or adjusted under 35 U.S.C. 154(b) by 343 days.

(21) Appl. No.: 11/467,385

(22) Filed: Aug. 25, 2006

(65) Prior Publication Data

US 2008/0123539 A1    May 29, 2008

(51) Int. Cl.
*G06F 11/00* (2006.01)
(52) U.S. Cl. .............................. 714/28; 714/5; 714/25; 714/44
(58) Field of Classification Search ...................... 714/5, 714/25, 28, 37, 44, 47; 370/241, 242, 251
See application file for complete search history.

(56) References Cited

U.S. PATENT DOCUMENTS

| | | | |
|---|---|---|---|
| 6,185,521 B1 * | 2/2001 | Vishlitzky | 703/26 |
| 6,233,660 B1 * | 5/2001 | Vishlitzky | 711/154 |
| 6,499,108 B1 | 12/2002 | Johnson | |
| 6,578,146 B2 | 6/2003 | Johnson | |
| 6,757,849 B2 * | 6/2004 | Balluff | 714/44 |
| 6,971,046 B1 * | 11/2005 | Johnson et al. | 714/25 |
| 7,206,974 B2 * | 4/2007 | Kozlov et al. | 714/44 |

* cited by examiner

*Primary Examiner*—Robert Beausoliel
*Assistant Examiner*—Joseph D Manoskey
(74) *Attorney, Agent, or Firm*—Head, Johnson & Kachigian

(57) ABSTRACT

A method and a system to emulate a mainframe data channel for testing and diagnostics of mainframe peripheral devices and for remote control and configuration of the testing and diagnostics. The system includes an emulator central processing unit communicably attached to at least one of the mainframe peripheral devices. First driver software is resident in the emulator central processing unit to initialize and start an adaptor for at least one mainframe peripheral device. Second channel program software is resident in the emulator central processing unit having commands to the emulator central processing unit and to the mainframe peripheral devices. Third application software is resident in the emulator central processing unit to test and diagnose the mainframe peripheral devices. Fourth software resident in the emulator central processing unit validates remote access to the emulator central processing unit.

13 Claims, 5 Drawing Sheets

Server Initialization          Figure 4

| 201 | Driver | Initialize module-wide variables utilized by Driver. |
|---|---|---|
| 202 | Driver | Enumerate adaptors using the adaptor's vendor and device IDs. |
| 203 | Driver | Initialize adaptor-specific variables utilized by Driver. |
| 204 | Driver | Allocate/reserve adaptor resources |
| 205 | Driver | Reset the adaptor. |
| 206 | Driver | Download microcode to the adaptor. |
| 207 | Driver | Initialize the adaptor. |
| 208 | Driver | Request a connection to each unique IRQ |
| 209 | Driver | Initiate a timer and timer support. |
| 210 | Driver | Expose standard module-wide support to applications. |
| 211 | Host DLL | Initialize variables utilized by Host DLL. |
| 213 | Host DDL | Expose and make available to SA, Adaptor specific Administrative instruction set. |
| 214 | Host DLL | Create a mutex (serialization mechanism) to be used by configuration support routines |
| 215 | Host DLL | Open (establishes communications with) the driver. |
| 216 | Host DLL | Request from the driver number of recognized adaptors. |
| 217 | Driver | Returns the number of adaptors in response to Host DLL request. |
| 218 | Host DLL | Request from the driver its version number. |
| 219 | Driver | Return the driver version number in response to the Host DLL request. |
| 220 | Host DLL | Record into SA log driver version and the number of adaptors it controls. |
| 221 | Driver | Reset initiator control data |
| 222 | Host DLL | Start sequencers, connecting them to matching driver initiators |

Server Termination               Figure 5

| 302 | Host DLL | Detach all sequencers from initiators |
|---|---|---|
| 303 | Host DLL | Close the driver. |
| 304 | Host DLL | Free all allocated storage and resources. |
| 305 | Driver | Stop the one-second timer. |
| 306 | Driver | Eliminate the module-wide exposure of support to applications through NT. |
| 307 | Driver | Ensure/cause each adapter to be offline and reset the adapter. |

REMOTELY CONTROLLED CHANNEL EMULATOR FOR TESTING OF MAINFRAME PERIPHERALS

BACKGROUND OF THE INVENTION

1. Field of the Invention

The present invention is directed to a process and a system to emulate a mainframe data channel for testing and diagnostics of mainframe peripheral devices. In particular, the present invention is directed to a device to emulate a mainframe channel which is self-contained and portable and permits testing and diagnostics of mainframe peripheral devices and permits remote control and configuration of the testing and diagnostics.

2. Prior Art

Mainframe channels are known, independent hardware and software components that coordinate input and output functions (I/O) between a mainframe central processing unit and a set of controllers or devices. Mainframe channels are used in computer systems, such as mainframes, that handle channel input/output operations independently of the computer system's central processing unit. A channel is an independent hardware and software component that coordinates all input and output instructions to a set of controllers or devices. Each channel may support one or more controllers and one or more devices. Channel programs are software that contain lists of commands to the channel device itself and to the various controllers and devices to which they are connected.

A mainframe has channels which allow peripheral equipment such as tape drives, direct access storage devices (DASD, or very large hard drives) and printers to be attached to the mainframe. Equipment directly attaching to a mainframe channel is commonly known as a control unit, or controller, through which one or more peripheral devices may be accessed.

The earliest generation of mainframe channels used a parallel (aka BUS and TAG) multiple copper coax cable architecture by which controllers could be attached in a daisy-chained manner. Parallel channels were slow, bulky and nowadays rarely encountered. The next generation utilized a serial fibre optic architecture called Enterprise Serial Connection (ESCON, aka Single Byte protocol or SB-1) which evolved into the Fibre Channel Connection (FICON, aka Single Byte protocol 2 or SB-2), each offering point-to-point connectivity.

In order that a single serial channel might connect to more than a single controller, equipment known as directors, which are enterprise-class switches, may be employed serving as a dynamic patch panel. A director also allows more than a single mainframe channel to be attached to it and, generally, any channel may reach any controller. Utilizing a director is known as switched point-to-point connectivity and conforms to a typical hub and spoke networking design.

Various people are interested in the operation of mainframe computers. These include mainframe designers, engineers needing to field test mainframes, and customers desiring to ensure correct function prior to committing to the addition of new equipment to their production environment. In each instance in the past, it was required that the facilities of a mainframe be available to them. This has sometimes been accomplished through the use of an additional test mainframe, which is typically complex and expensive to maintain.

The costs entailed by a mainframe computer are substantial, requiring numerous personnel and equipment. Hardware staff and vendors manage and connect the hardware, systems software personnel load and configure the software onto it, and operations staff monitor it, responding to important events requiring intervention. Further, mainframes may be configured to run one of a number of operating system types, not all of which offer a conducive environment for testing equipment.

A channel command word (CCW) is a command used to perform an I/O operation. CCWs are often chained to form channel programs.

Although there are existing standard channel programs, additional complexities arise in how custom channel programs are developed and executed on a host mainframe. Unless a user is satisfied with using pre-existing utilities such as a copy routine, the user must develop channel programs using Assembler language which is fairly arcane and exceedingly complex when compared to higher level languages. To make matters worse, these programs must be placed into authorized locations meaning that data security personnel must become involved at some point. The user must also be able to log onto the system, submit jobs into it, ensure they become started, then use some host mainframe facility to process the final results.

Finally, designing of new peripheral devices and new channel programs requires testing.

In addition to serving as a facility for testing existing devices, the invention affords the ability to aid with the design of new peripherals. Using it, an equipment manufacturer can quickly test various channel program sequences to aid in two areas: first, to ensure the device behaves as intended during its design and second, to develop and optimize the channel programs for introduction into host mainframe utilities to be created to operate the new equipment. Since the invention is devoted towards this type of function, it is far easier to use than a mainframe, allowing a developer to focus on the tasks he needs to accomplish rather than having to deal with the complexities of a mainframe's environment.

There remains a need to provide a mainframe channel emulator which can be operated independent of a mainframe computer for testing and diagnostics of mainframe peripheral devices.

There remains a need for a mainframe channel emulator which permits remote control and configuration of the testing and diagnostics.

There remains a need for a mainframe channel emulator which is self-contained and portable.

There also remains a need for a mainframe channel emulator which may be remotely controlled via a secure connection and a secure procedure.

SUMMARY OF THE INVENTION

The present invention is directed to a remotely controlled channel emulator for testing and diagnostics of the mainframe peripheral devices. The present invention also allows remote controlled configuration of the testing and diagnostics. The invention includes an emulator central processing unit which is in communication and attached to at least one of the mainframe peripheral devices either directly or through a director class switch. First device driver software is resident in the emulator central processing unit to initialize and start at least one adapter for at least one of the mainframe peripheral devices. Channel program software resident in the emulator central processing unit includes commands to both the emulator central processing unit and to the mainframe peripheral device or devices. Application software resident in the emulator central processing unit is capable of performing testing and diagnosis of the mainframe peripheral device or devices.

BRIEF DESCRIPTION OF THE DRAWINGS

FIG. 4 is a sequential flowchart of initialization and FIG. 5 is a sequential chart of termination of a remotely controlled channel emulator constructed in accordance with the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
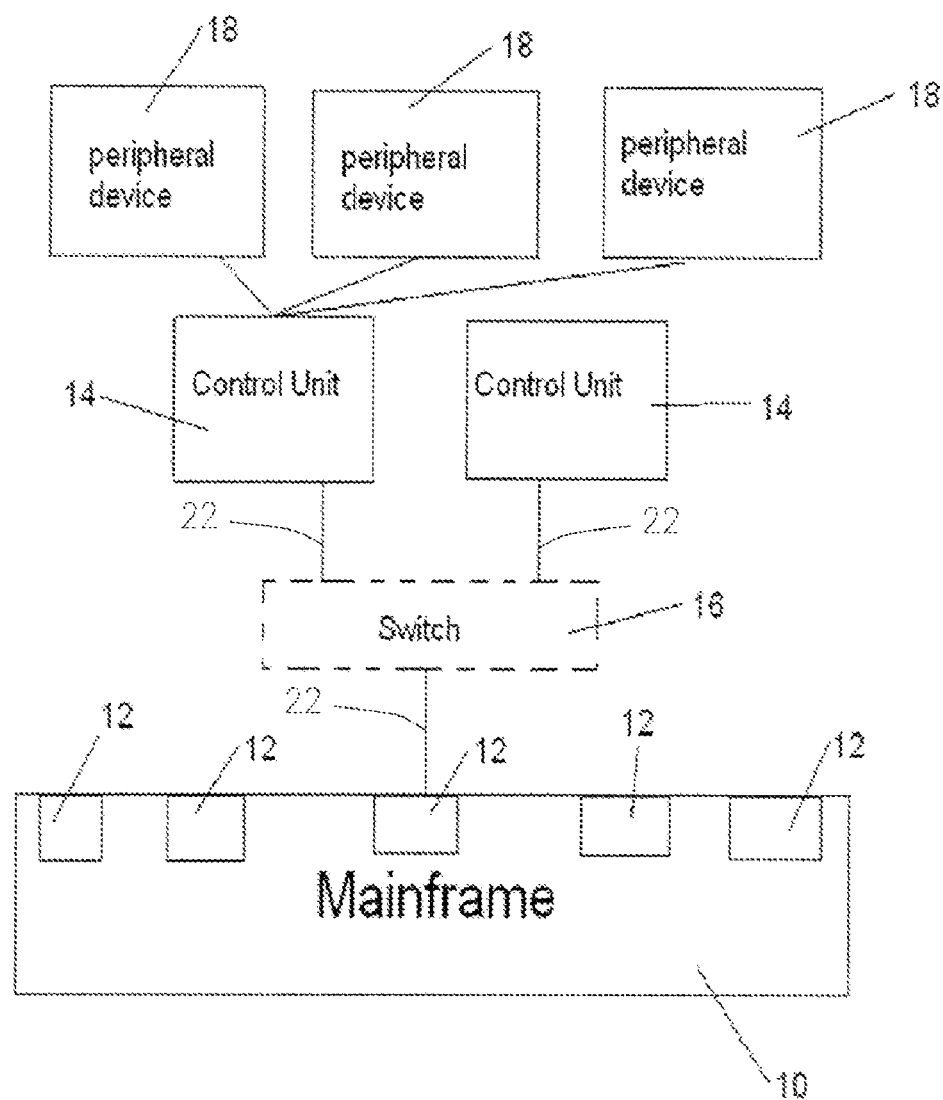
FIG. 1 is a simplified diagram showing an arrangement for a mainframe computer having channels utilizing peripheral devices as known in the prior art.

Referring to the drawings in detail, FIG. 1 shows a diagrammatic view of a mainframe computer and arrangement prior to the introduction of the present invention. A mainframe computer 10 includes one or more channel devices or units 12.

A control unit or control units 14 are connected to a channel device or unit 12. A director or switch 16 (shown in dashed lines) may optionally be interposed between the control units 14 and the channel device or unit 12. Communication is accomplished in a variety of ways.

The channel devices or units 12 may be connected to the switch 16 and control unit 14 through a channel such as fiber channel connection (FICON), enterprise serial connection (ESCON) or other applicable channel type as illustrated by reference numeral 22.

Each control unit 14 may be connected to one or more peripheral devices 18. The peripheral devices 18 may include various sorts of tape drives, direct access storage devices (DASD), printers or other devices that operate with mainframe computers. The foregoing arrangement is well known to those skilled in the art.

Figure 2:
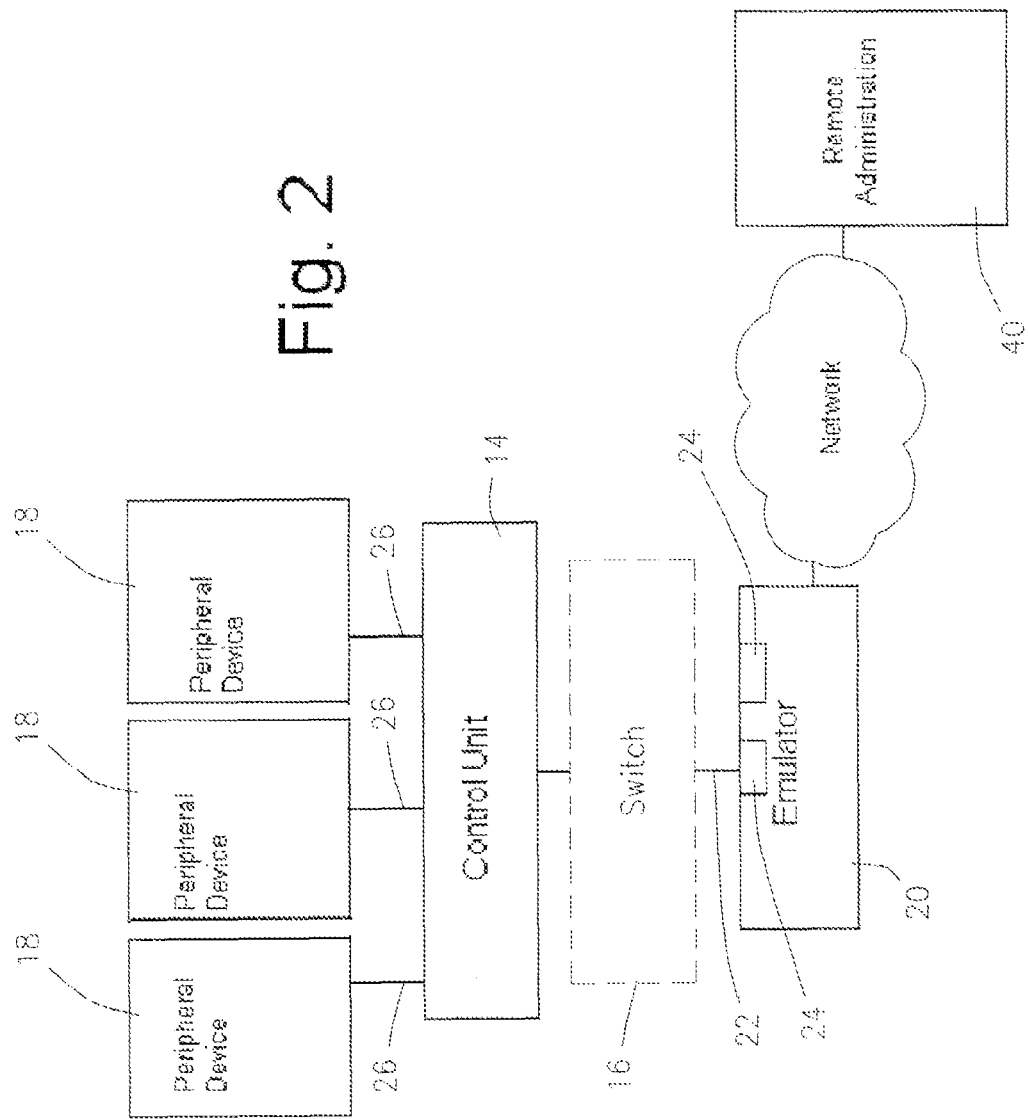
FIG. 2 is a simplified diagram of a remotely controlled channel emulator constructed in accordance with the present invention.

FIG. 2 illustrates a diagrammatic view of a channel emulator 20 utilized in accordance with the present invention.

The emulator 20 includes one or more adapters 24, to be described in detail below. The emulator 20 is connected to a control unit 14 (or alternatively, directly to a peripheral device that includes integrated control unit capability) via mainframe channel connection 22. A control unit 14 is, in turn, connected to one or more peripheral devices 18 via connections 26.

Figure 3:
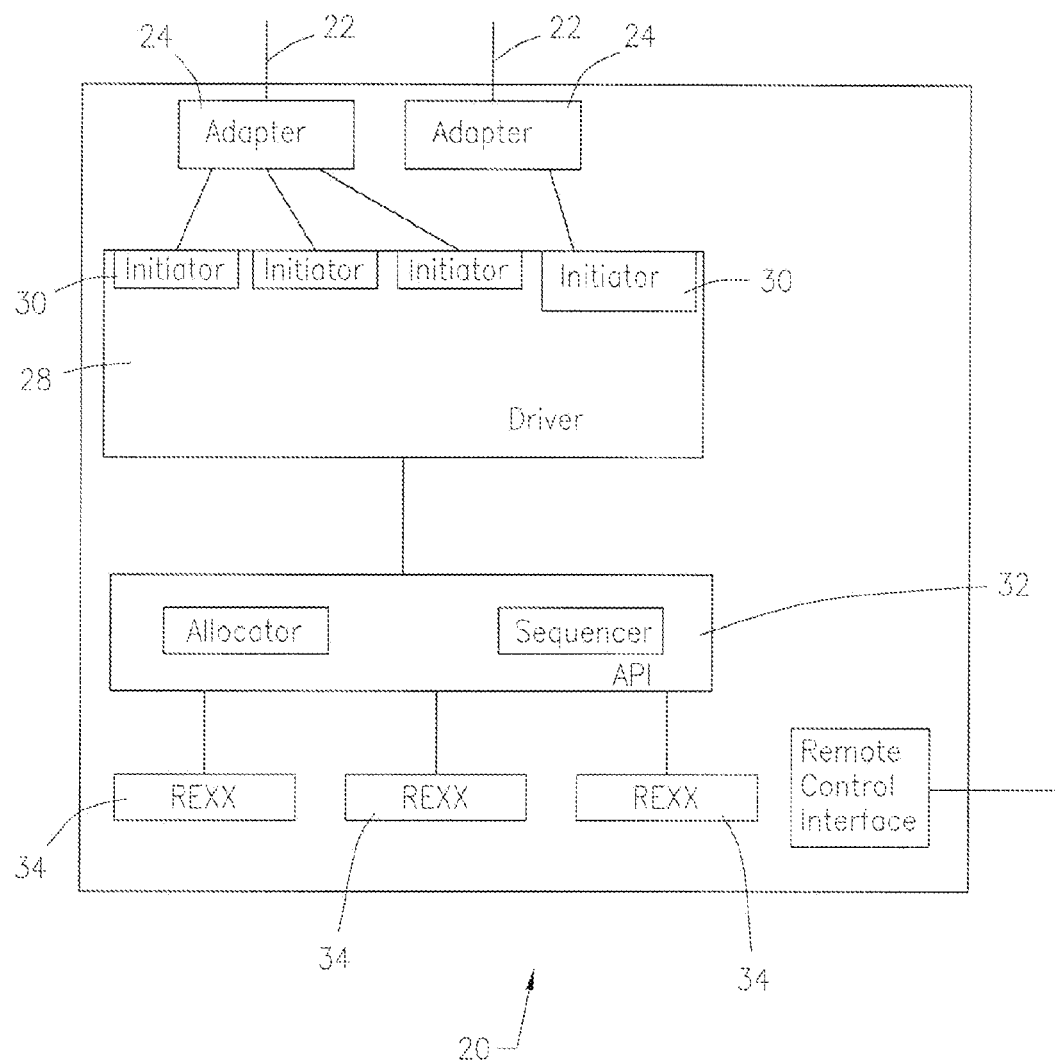
FIG. 3 is a simplified diagram of an emulator central processing unit of the present invention.

FIG. 3 illustrates a diagrammatic view of the emulator 20. The present invention 20 emulates one or more mainframe channels, allowing testing of peripheral devices which attach to mainframes without requiring the facilities of a mainframe. It is a modestly sized, standalone unit with one or more channel connections and a network connection. It is light enough to be easily carried from one location to another as required. It only requires that normal power be supplied to it, a suitable mainframe type channel cable attached to it in order to connect to the device controller or devices to be tested, and a network connection established to remotely control its function. Just like a mainframe channel, it may be directly connected to a controller or through a fiber channel switch or ESCON or FICON director or another mainframe suitable switch to one or more controllers.

In direct comparison to a mainframe computer, the present invention can be set up to function by a single person in a very short period of time, sample materials being provided to allow rapid development and deployment of testing procedures.

The present invention is able to run on a variety of operating systems such as Windows™, Linux, Macintosh's OS X™, and SUN Solaris. Device driver software or driver 28 is started which binds to suitable data channel adapters 24 present in the system for exposure to an application so that it might operate them. The drive software 28 either scans for supported adapters present in the system or, depending on the operating system, is provided with an association to such adapters by the operating system. One bound to an adapter, the driver software 28 initializes it per the adapter's interface specifications, downloads any necessary code to it and programs it to function in a desired manner.

When application software 32 starts, it attaches to the driver software 28 and queries of it the number and types of available adapters over which the driver has assumed control. The driver software 28 also propagates events to the application software, such as whether the channel adapter has established or lost a connection, the speed of a connection and whether it is directly attached to a controller or instead to a switch.

The driver software 28 includes a number of initiators 30. The driver software 28 allows a large quantity of initiators to be utilized by the application, each initiator 30 being dedicated towards performing input and output operations to a single device. The emulator also includes application software 32. The initiator is able to receive from the application a set of operations to be performed and controls its sequence of execution. When those operations are completed it provides the results back to the application. Additionally, an initiator 30 also promotes to the application any unsolicited events generated by the device. The set of operations sent to the initiator for execution are constituted by a chain of one or more chained Channel Command Words, or CCWs, such a set being known as a channel program. Each CCW contains a single channel command (or is chained to the next CCW) which might refer to a data area for transfer to or from the device. A channel command might perform a read operation, a write operation or a control operation and is specific to the device type being tested. Status events received from the device are provided in the result of the execution to the application. The channel program format used by the invention utilizes CCWs which are unmodified from those employed by a mainframe.

A mainframe's CCW might include a pointer to any location in main storage for the I/O operation indicated by the channel command. If that command indicates that a read operation is to occur then it represents the location into which the resulting read data will be stored. If the command indicates that a write operation is to occur then it represents the location from which the write data will originate. For the invention, a single block of data is passed to the initiator 30 which includes the entirety of the channel program and the data to which it references. The initiator performs normal address translation on the CCW data addresses making the channel program identical in format to that already documented for use on mainframes.

In order to provide flexibility, the application software 32 layer includes a procedural language, in this case REXX, to accomplish testing as shown at 34. REXX is heavily employed as a mainframe procedural language and is therefore likely that those using our invention will already know it or otherwise work with associates that do. It is a well documented high-level programming language very suitable for the purposes of the invention. The invention allows many instances of REXX programs (tasks) to be simultaneously executing.

Each REXX task is able to determine the status of a particular adapter, such as whether or not it is connected, and may allocate an initiator for it under control of the application. There is a corresponding application layer element associated with each initiator, known as a sequencer 36, which is responsible for relaying information between a REXX task and the initiator to which it's bonded. Each initiator operates independently of any other initiator's operations. Once an initiator 30 is allocated, the REXX task specifies the following criteria which is used to address the appropriate device.

The source channel image to assume (aka Logical Partition or LPAR).

Which control unit image within the controller to select (aka Control Unit Address or CUADD).

Which device on the specified CUADD to select.

If connection is by way of a switch, the port number to which the desired controller is connected.

(This example is for FICON but is similar for other mainframe channel types).

The application layer software 32 collects this information and passes it to the driver software 28 as a form of an open request. The driver 28 considers the information and rejects it if it matches that already in use by another initiator since I/O to the same device from two differing sources would cause unpredictable results. If unique, it then compares the request to all other active initiator's criteria to determine whether another has a connection to a different device on the same controller using the same CUADD since addressability must first be performed to the CUADD before any device access may occur. The method to accomplish this involves the transmission of an Establish Logical Path (ELP) to the controller. If no other initiator shares connectivity to the same CUADD, then an ELP is issued which is either accepted or rejected by the controller. If another initiator is found that shares the same CUADD then another ELP is not issued and connectivity is assumed.

When a REXX task is done with an initiator having previously performed a successful open request then the application passes a close request to the driver. The driver then issues a Remove Logical Path (RLP) to the controller unless another initiator continues to use the same CUADD in which case the RLP is bypassed. If a REXX task abnormally terminates, the application automatically performs the necessary close processing on its behalf.

Between open and close processing, the REXX task may construct a channel program whereupon the application passes it to the driver for execution. REXX helper functions exist to formulate the block of data which is comprised of CCWs including the data they might reference. The helper functions are designed so that the end user doesn't have to deal with CCW formats. The end user may specify how many CCWs are involved, how much data each CCW references, how that data should be initialized and each CCW's channel command. The addressing information provided to the open function is retained and utilized during channel program execution.

Once the data block is received by the driver, it processes the channel program against the device indicated during the open request in a manner consistent with the Fibre Channel-Single-Byte Command Code Sets Mapping Protocol-2(FC-SB-2) publication (ANSI INCITS 349-2001) or other suitable mainframe data channel protocols. Once final status is received from the device it is returned to the application layer along with any received data placed into the data block for processing by the associated REXX task.

In addition to the general operation of a device, a REXX task can also control whether channel tracing should occur and, if so, at what level of detail.

A REXX task may be specified to be automatically executed when the application is started. Since a REXX task may launch additional REXX tasks this provides the means by which an entirely automated operations might be performed. Beyond this, however, an administrator program, executed on remote administrative system 40 and connected to the channel-attached unit by way of a network connection, is generally used to manipulate the REXX programs on the channel-attached unit.

Connectivity to the emulator 20 by the administrator program is secure and follows the teaching of Applicant's patent, U.S. Pat. No. 6,578,146 which is incorporated herein by reference.

The user of the administrator program (the administrator) may enumerate all REXX programs that are present on the channel-attached invention as well as those which have been launched and are currently being executed. The administrator may freeze (suspend) or kill (terminate) any such executing task. The administrator may also copy any REXX program from the channel-attached unit to his system, copy any REXX program from his system to the channel-attached unit or select any REXX program on the channel-attached unit to be edited.

The administrator may also manipulate REXX global variables which every REXX task may retrieve or modify.

Additional REXX functions exist affording such actions as generating SNMP traps, generating e-mails connecting to and logging onto actual host mainframes, and far more.

In addition to serving as a facility for testing existing devices, the present invention affords the ability to aid in the design of new peripherals. Using it, an equipment manufacturer can quickly test various channel program sequences to aid in two areas: first, to ensure the device behaves as intended during its design and second, to develop and tune the channel programs for introduction into host mainframe utilities to be created to operate the new equipment. Since the invention is devoted towards this type of function it is far easier to use than a mainframe allowing a developer to focus on the tasks he needs to accomplish rather than having to deal with the complexities of a mainframe's environment.

The invention can also serve as a problem resolution tool when a mainframe is having trouble utilizing a device when the mainframe, the device and the invention are each attached to different ports on the same director switch. In this case, when there is a question regarding whether a device is behaving properly, it can be logically disconnected from the mainframe by way of a command from an operator console at which time the invention may access and test the device. This can help determine whether or not the problem is with the device or with the mainframe's channel. Support personnel can perform this entire operation remotely, in a secured fashion.

FIG. 4 illustrates a step-by-step sequential flowchart of the process for initialization. Conversely, FIG. 5 illustrates a sequential flowchart of the steps for termination. The term SA refers to Applicant's own proprietary process, known as SecureAgent also detailed in U.S. Pat. No. 6,578,146.

In one preferred embodiment of the process, the present invention includes the following sequential steps of operation:

1. A REXX task is launched either automatically at startup, by another REXX task or upon demand by a remote administrator.
2. The interpreter executes the REXX task's instructions.
3. The task claims access to one or more initiator+sequencer bonds by way of a request to the allocator, specifying the device target.
4. The task utilizes APIs to construct a channel program in a high level manner.
5. The task submits a prepared channel program to a sequencer which, in turn, provides it to its matching initiator.
6. The initiator transmits the channel program to the device target.
7. The initiator receives the channel program results from the device target.
8. The initiator returns the results of the completed channel program back to the task through the sequencer.
9. The task processes the outcome of the channel program's execution in a program independent manner.

Whereas, the present invention has been described in relation to the drawings attached hereto, it should be understood that other and further modifications, apart from those shown or suggested herein, may be made within the spirit and scope of this invention.

What is claimed is:

1. A system to emulate a mainframe channel for testing and diagnostics of mainframe peripheral devices and for remote control and configuration of testing and diagnostics of said mainframe peripheral devices, which system comprises:
   an emulator central processing unit communicably attached to a mainframe channel switch which, in turn, is connected to a control unit which, in turn, is connected to at least one of said mainframe peripheral devices; wherein said emulator central processing unit operates independently of any mainframe computer;
   first device driver software resident in and processed by said emulator central processing unit to initialize and start at least one adapter for said at least one of said mainframe peripheral devices;
   second channel program software resident in and processed by said emulator central processing unit with commands to said emulator central processing unit and to said mainframe peripheral devices;
   third application software resident in and processed by said emulator central processing unit to test and diagnose said mainframe peripheral devices; and
   fourth software to validate remote access between said emulator central processing unit and a remote administration central processing unit communicably attached thereto.

2. A system to emulate a mainframe channel as set forth in claim 1 wherein said fourth software is resident in and processed by said emulator central processing unit to validate remote access between said emulator central processing unit and said remote administration central processing unit.

3. A system to emulate a mainframe channel as set forth in claim 1 wherein said system is self-contained and portable.

4. A system to emulate a mainframe channel as set forth in claim 1 wherein said emulator central processing unit is communicably attached to at least one of said mainframe peripheral devices through a suitable mainframe channel connection.

5. A system to emulate a mainframe channel as set forth in claim 1 wherein said emulator central processing unit is communicably attached to said remote administration central processing unit via a network.

6. A method to emulate a mainframe channel for testing and diagnostics of mainframe peripheral devices and for remote control and configuration of testing and diagnostics, which method comprises:
   attaching an emulator central processing unit to a mainframe channel switch which is, in turn, connected to a control unit which is, in turn, connected to at least one of said mainframe peripheral devices, wherein said emulator central processing unit operates independently of any mainframe computer;
   starting device driver software resident in the emulator central processing unit in order to initialize and start at least one adapter for said at least one of said mainframe peripheral devices;
   initiating channel program software resident in the emulator central processing unit with commands to both the emulator central processing unit and to said at least one mainframe peripheral device;
   testing and diagnosing said at least one of said mainframe peripheral devices with application software resident in said emulator central processing unit; and
   validating remote access between said emulator central processing unit and a remote administration central processing unit communicably attached thereto.

7. A method to emulate a mainframe channel for testing and diagnostics as set forth in claim 6 including interfacing between said emulator central processing unit and said remote administration central processing unit via a network.

8. A method to emulate a mainframe channel for testing and diagnostics as set forth in claim 7 including manipulating and enumerating said application software of said emulator central processing unit using said remote administration central processing unit.

9. A method to emulate a mainframe channel for testing and diagnostics as set forth in claim 8 including copying said application software from said emulator central processing unit to said remote administration central processing unit, copying a second application software resident on said remote administration central processing unit from said remote administration central processing unit to said emulator central processing unit, or selecting and editing said application software on said emulator central processing unit from said remote administration central processing unit.

10. A system to emulate a mainframe channel for testing and diagnostics of a mainframe peripheral device and for remote control and configuration of testing and diagnostics of said mainframe peripheral device, which system comprises:
   an emulator central processing unit having at least one data channel adapter; said emulator channel processing communicably attached to a control unit via a suitable mainframe channel connection; said control unit communicably attached to said mainframe peripheral device; and said emulator central processing unit being independently operable from a mainframe computer
   a device driver software resident in and processed by said emulator central processing unit to bind to and to initialize said data channel adapter; said device driver software having an initiator to perform input and output operations to said mainframe peripheral device;

an application software resident in and processed by said emulator central processing unit to bind to said driver software and to determine said data channel adapter to which said driver software has been bound; said application software further comprising:
- a channel program having a set of channel commands to be performed by said initiator;
- a mainframe procedural language program for determining a status of said data channel adapter and to allocate said initiator for said data channel adapter;
- a sequencer for relaying information between said procedural language program and said initiator; and a remote administration central processing unit having a remote access validation software and being remotely connected to said emulator central processing unit by way of a secure network connection; wherein said remote administration central processing unit manipulates said procedural language program of said application software of said emulator central processing unit for remote testing and diagnostics of said mainframe peripheral devices.

11. A system to emulate a mainframe channel as set forth in claim 10 including a suitable mainframe channel switch.

12. A system to emulate a mainframe channel as set forth in claim 10 wherein said initiator of said device driver software is a plurality of initiators, with each initiator operating independently of the operations of any other initiators.

13. A system to emulate a mainframe channel as set forth in claim 10 wherein said procedural language program automatically executes when said application software starts execution.

* * * * *